United States Patent Office 2,712,510
Patented July 5, 1955

2,712,510
IMPROVING PROPERTIES OF METALS

Adolph W. Machlet, Elizabeth, N. J.

No Drawing. Application May 24, 1954,
Serial No. 432,010

4 Claims. (Cl. 117—130)

This invention deals with a process for improving the properties of metals, particularly with respect to hardness and toughness, by treatment with an aqueous slurry of charcoal and zircon and also in conjunction with mica.

In patent application Serial Number 256,380, filed on November 14, 1951, by Adolph W. Machlet, now Patent No. 2,683,675, of which this application is a continuation-in-part, a process was described wherein materials containing metals of group IV of the periodic system were employed in slurry form with charcoal to improve metal properties. There was described, in particular, treatment with an aqueous slurry containing granulated zircon (zirconium silicate) which, when mixed with granulated charcoal, served as an excellent improving agent for lower quality metals.

In this previously filed application, the slurry was prepared by intimately mixing granulated zircon in about 50–50 proportion by weight with granulated charcoal, and then made into a thin slurry with water. Pieces of cast iron, bronze, brass, iron or steel, and the like, in the form of nails, hardware, such as hinges, locks, and the like, or gears, firearms parts, jig parts, machine tools, carpenter tools, etc. were immersed in the slurry for about 12 to 24 hours at room temperature, whereupon the desired improvement in the parts took place.

This "cold alloying" type of treatment appears to be effected by reason of a difference in the electrical potential between the treating compound and the metal being treated. This potential results in the alloying of the metal present in the slurry compound with the metal treated to the extent that the treated metal is penetrated completely with the alloying ingredients, thereby being altered throughout the entire cross section of the treated metal. Furthermore, it appears that this alloying effect is not restricted to the portion of the metal immersed in the slurry, but that the alloying components from the slurry are "soaked up" into the portion of the metal extending or protruding beyond the immersed portion, the action being a diffusion of a liquid into the pores of a solid skin to the soaking up of water by means of a blotter.

It has been found further that when iron or steel is treated in accordance with this invention, and the metal is allowed to be subjected to the corrosive action of air and water vapor, there is no rusting as a result, but rather there results a formation of a "galvanic ash" which is produced by impurities present in the metal and which is different from rust in that its formation does not substantially alter the important properties of the treated metal.

It has been found that superior properties can be obtained by incorporating into the zircon-charcoal slurry, an amount of granulated mica which may be in the purified form, although the material in natural form, such as in the form of Pennsylvania mica stone is satisfactory. The stone is crushed as fine as possible say to at least to 200 mesh, and mixed, with the zircon, preferably in equal volume. This mixture then is mixed, preferably with an equal volume of charcoal and the entire composition is mixed with water into the form of a thin slurry. The metal parts are immersed in this slurry for about 12 to 48 hours for optimum absorption of alloying components to improve the metal articles treated.

In one recommended treatment operation, 100 parts by volume of zircon (200 mesh), and 100 parts by volume of crushed Pennsylvania mica (200 mesh) and 35 parts by volume of No. 10 charcoal are intimately mixed until a uniform dispersion is obtained. The mixture then is stirred into at least 3000 parts of water and the stirring is maintained for several minutes. Thereafter, the iron or steel parts to be treated are immersed in this slurry and allowed to soak for a period of about 12 hours. It has been found that the zircon-mica mixture may be modified in proportions from about 70% zirconia by volume to about 30% zirconia. The charcoal in the ternary mixture may vary from about 5% by volume to about 40%.

The amount of water employed in the slurry for treatment may vary roughly from 2 parts by volume of water to one part of ternary solid mixture, to 100 parts of water to one part of ternary solid mixture, or even greater. A small amount of surface active compound may be added to the solids or slurry in order to facilitate penetration into the metal being treated.

The improved properties of the treated metals may be observed by rubbing the exposed treated metal with a knife edge of hard metal. It will be apparent that hardness and toughness characteristics are improved considerably. The treated metals also take on a bright and glossy polish when subjected to a slight buffing operation. Instead of charcoal, there can be used comminuted carbon, carbon black, and the like.

When the treatment is to be done at a distant location, it is found convenient to prepare the dry treating composition (such as the ternary blend), and to ship this dry treating powder to the treating location at which place the powder may be made into a slurry by adding water.

Instead of zircon, other zirconium compounds, such as zirconium oxide, zirconate, zirconic acid, and the like, may be employed.

I claim:

1. The process of improving the physical characteristics of a metal comprising treating said metal at room temperature with an aqueous slurry of a granulated zirconium compound, a granulated mica and about 5% to about 40% by volume of comminuted carbon dispersed therewith.

2. The process according to claim 1 in which the slurry contains about 100 parts by volume of zirconium compound, about 100 parts by volume of mica, and about 35 parts by volume of charcoal.

3. The process according to claim 1 in which the zirconium compound is zircon.

4. The process according to claim 1 in which the mica is in the form of Pennsylvania mica.

References Cited in the file of this patent

UNITED STATES PATENTS 2,168,638   Wilkerson _____ Aug. 8, 1939